United States Patent [19]
McCartney et al.

[11] Patent Number: 5,733,020
[45] Date of Patent: Mar. 31, 1998

[54] APPARATUS FOR INHIBITING WIRE, CABLE AND THE LIKE FROM ENTANGLING THE AXLE ASSEMBLY OF A WHEELED VEHICLE

[75] Inventors: Robert Anthony McCartney, Poynton; Neil John McCartney, Hazel Grove, both of England

[73] Assignee: Bernard McCartney Limited, England

[21] Appl. No.: 562,251

[22] Filed: Nov. 22, 1995

[51] Int. Cl.$^6$ ................................. B62D 55/088
[52] U.S. Cl. ............................... 305/107; 305/110
[58] Field of Search ......................... 305/12, 100, 107, 305/109, 110; 404/129; 172/112, 610

[56] References Cited

U.S. PATENT DOCUMENTS

| 4,818,040 | 4/1989 | Mezzancella et al. | 305/110 X |
| 4,830,439 | 5/1989 | Collins et al. | 305/110 |
| 5,330,260 | 7/1994 | Freeman | 305/110 |
| 5,370,451 | 12/1994 | Brownlee et al. | 305/107 |
| 5,553,932 | 9/1996 | Freeman | 305/107 |

OTHER PUBLICATIONS

Copy from Caron brochure entitled "The Caron Landfill Protection Group" No Date.
Brochure "816B/826C Solid Reasons to Choose Cat® Compactors" 1989.

*Primary Examiner*—Russell D. Stormer
*Attorney, Agent, or Firm*—Pravel, Hewitt, Kimball & Krieger

[57] ABSTRACT

Apparatus for inhibiting elongate flexible elements such as wire cable and the like from entangling the axle assembly (1) of a vehicle wheel (2) comprises a guard member (40 securable to the vehicle axle assembly (1) between the wheel (2) and the body of the vehicle (3). The guard member (4) has a radially outer portion (9) which in use lies adjacent the wheel rim (2b) so as to substantially prevent elongate flexible elements from passing between the guard member (4) and the wheel (2). The outer portion (9) of the guard member (4) may be provided with at least one cutting edge (10) for cutting elongate flexible elements which are pulled thereover by rotation of the vehicle wheel 2. A further member (5) may be provided which in use extends between the vehicle body (3) and the guard member (4) so as to inhibit elongate flexible elements from passing between the vehicle body (3) and the guard member (4) and entangling the axle assembly (1).

15 Claims, 2 Drawing Sheets

APPARATUS FOR INHIBITING WIRE, CABLE AND THE LIKE FROM ENTANGLING THE AXLE ASSEMBLY OF A WHEELED VEHICLE

BACKGROUND OF THE INVENTION

This invention relates to an apparatus for inhibiting wire, cable and the like from entangling, and thus fouling, the axle assembly of a vehicle wheel. In particular, the invention relates to the provision of such apparatus for fitting to landfill compactor vehicles.

Large wheeled vehicles, widely referred to as landfill compactor vehicles, are conventionally used to compact waste material disposed of in landfill sites. Such vehicles have large toothed wheels (typically having a diameter of about 4 ft to 5.5 ft) which break-up and compact waste material as the vehicle is driven over the landfill site. A wide variety of different types of domestic and industrial waste are disposed of in landfill sites, which can include wire, cable, rope and the like.

A known problem with such landfill compactor vehicles is that as the vehicle wheels rotate the teeth on the wheels can snare and thus pick-up wire, cable and the like which can then become tightly wound around the vehicle axle assembly as the wheel continues to rotate. Accordingly, such vehicle axle assemblies tend to become fouled by cable/wire and similar material over time so that it is periodically necessary to remove the vehicle from service and remove the wheel assembly so that any wire etc. entangling the axle can be removed. This is clearly a disadvantage with such known landfill compactor vehicles.

Attempts have been made to prevent (or at least reduce) the entanglement of wire etc. around such vehicle axles by the provision of adapted "mud guards". Such devices have not, however, proved particularly successful in practice.

SUMMARY OF THE INVENTION

It is an object of the present invention to provide apparatus for inhibiting elongate flexible elements such as wire, cable and the like from entangling the axle assembly of a vehicle wheel.

Accordingly, the present provides a guard member which is securable to a vehicle axle assembly between the vehicle wheel and the vehicle body. The guard member has a radially outer portion which, with the guard member secured to the axle assembly, lies adjacent the vehicle wheel so as to substantially prevent elongate flexible elements from passing between the guard member and the wheel. The apparatus further includes at least one cutting edge arranged on or adjacent the outer portion of the guard member so as to cut any elongate flexible elements which are pulled thereover by rotation of the vehicle wheel.

The, or each, cutting edge may be defined by the outer portion of the guard member. For instance, in a preferred embodiment of the invention the outer portion of the guard member defines an arcuate surface which has two opposite ends and which, in use, lies adjacent the rim of the wheel, at least one end of the arcuate surface (and preferably both ends of the arcuate surface) defining a cutting edge. The arcuate surface is preferably designed to lie adjacent the rim of the wheel and follow the curvature of the wheel.

Preferably the apparatus also comprises at least one further member which in use extends between the guard member and the vehicle body so as to inhibit elongate flexible elements from passing between the guard member and the vehicle and entangling the axle assembly. The or each said further member is preferably adapted to allow a degree of relative movement between the guard member and the vehicle body in a generally vertical direction.

In a preferred embodiment of the invention, the guard member comprises a plate which supports said outer portion of the guard member and which in use lies substantially parallel to the vehicle body. The plate is provided with at least one substantially vertical slot and the apparatus further comprises a tooth member which is securable to the vehicle body and which supports at least one tooth so that in use said tooth extends from the vehicle body and is received within the slot in the plate. The tooth member thereby inter-engages with the guard member so as to permit a degree of relative movement between the guard member and the vehicle body in a generally vertical direction whilst inhibiting elongate flexible elements from passing between the guard member and the vehicle body and entangling the axle.

The plate may be provided with a plurality of substantially vertical slots arranged generally parallel to one another, and said tooth member may be provided with the corresponding teeth which in use are received within respective slots in the plate. The teeth may be arranged in an arcuate array.

The present invention also provides apparatus for inhibiting elongate flexible elements from entangling the axle assembly of a vehicle wheel, in which the axle assembly is mounted to the vehicle such that it is capable of generally vertical movement relative thereto as the vehicle moves, the apparatus comprising a guard member securable to the vehicle axle assembly between the body and having a radially outer portion which in use lies adjacent the wheel. The apparatus includes at least one further member which in use extends between the vehicle body and the guard member so as to inhibit elongate flexible elements from passing between the vehicle body and the guard member and entangling the axle assembly. The or each further member is adapted to co-operate with the guard member and the vehicle body in such a way as to permit a degree of relative movement between the vehicle body and the guard member in a generally vertical direction.

The present invention further provides a wheeled vehicle, comprising a vehicle body and a plurality of wheels mounted on respective axle assemblies which extend from the vehicle body, at least one axle assembly having associated therewith apparatus as described above.

Other features and advantages of the invention will become apparent to those skilled in the art upon review of the following detailed description, claims and drawings.

DETAILED DESCRIPTION OF A PREFERRED EMBODIMENT

Figure 1:
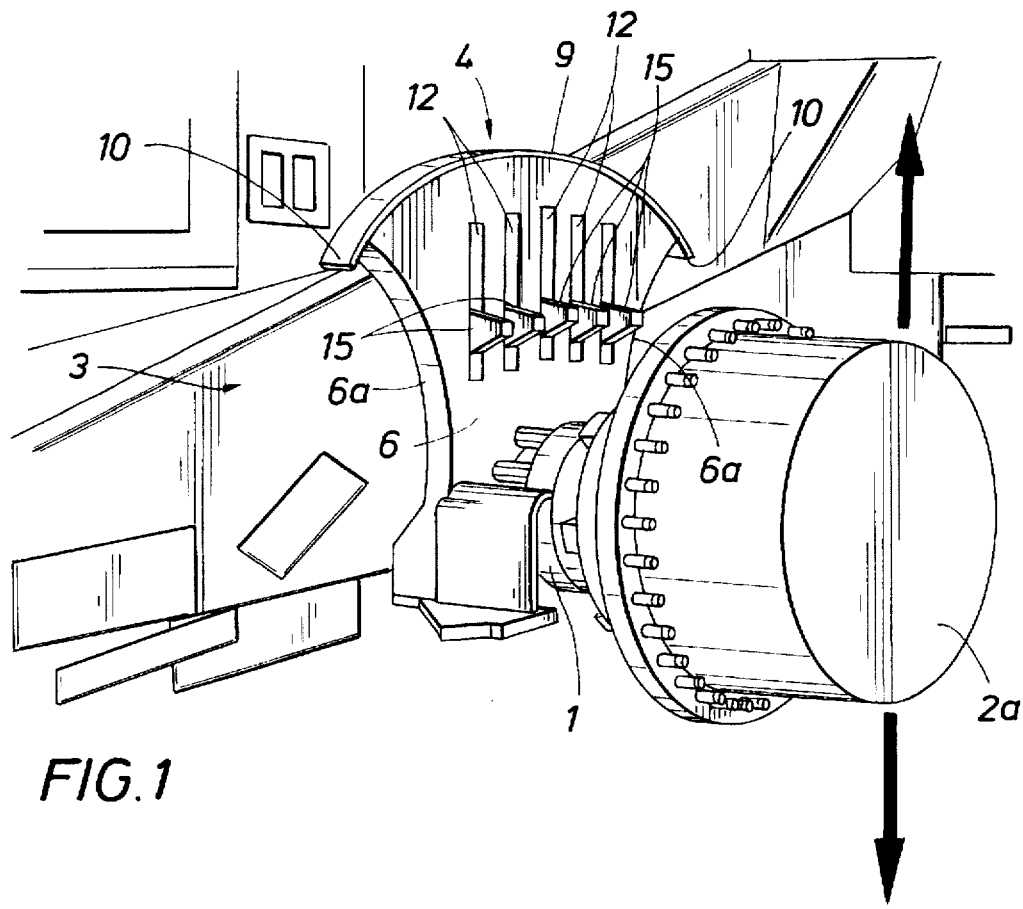
FIG. 1 is a perspective view of apparatus in accordance with a preferred embodiment of the present invention fitted to a vehicle axle assembly, shown with the respective vehicle wheel removed.
Figure 2:
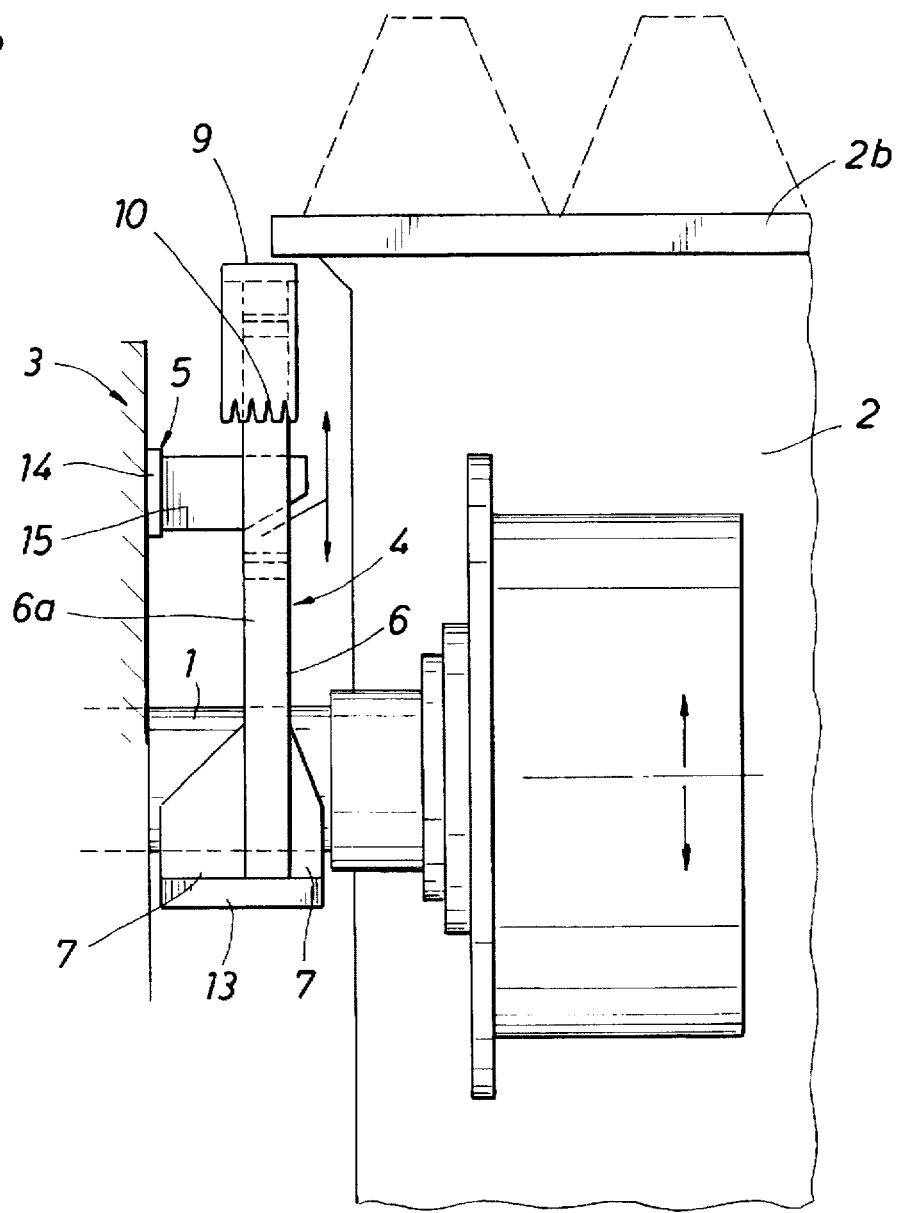
FIG. 2 is an end view of FIG. 1 with a wheel schematically illustrated in position.

Referring to the drawings, FIGS. 1 and 2 illustrate apparatus in accordance with the present invention fitted to the axle assembly 1 of one wheel 2 of a landfill compactor vehicle. The vehicle body is not shown in detail and is designated by the reference numeral 3. Although the apparatus is described below in relation to one axle/wheel assembly it will be appreciated that the apparatus will generally be fitted to each axle/wheel assembly of the vehicle.

The particular apparatus described below is designed to be retro-fitted to a conventional axle/wheel assembly of a known landfill compactor vehicle and thus only features of these elements which are relevant to operation of the apparatus will be described in detail.

Figure 3:
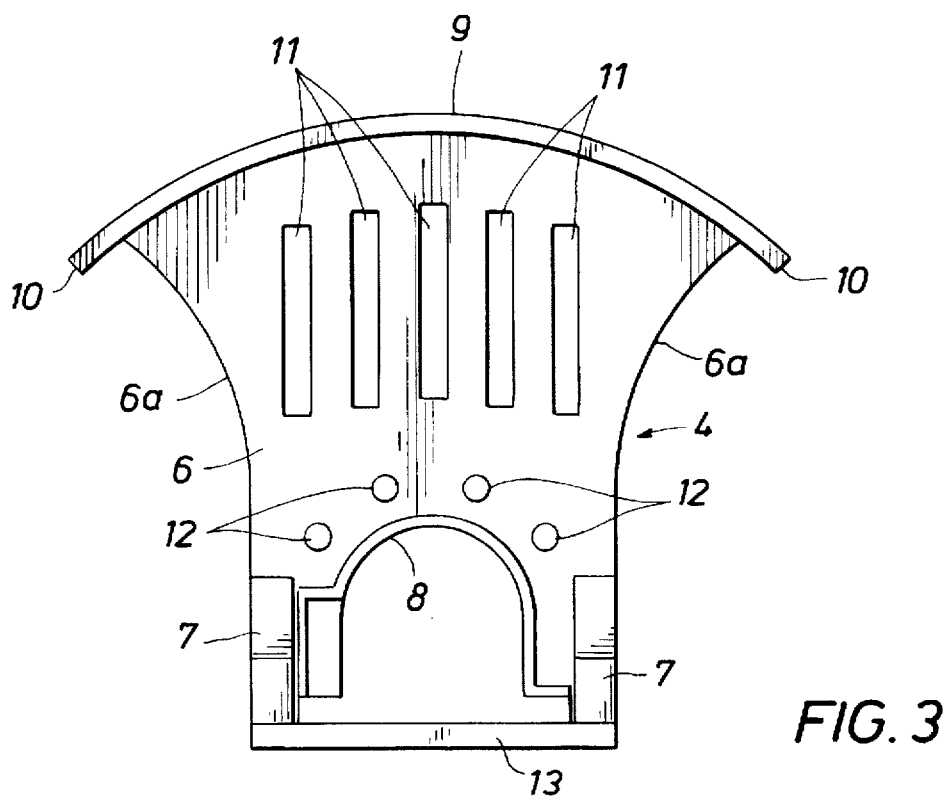
FIG. 3 is a front view of a first part of the apparatus illustrated in FIGS. 1 and 2.
Figure 4:
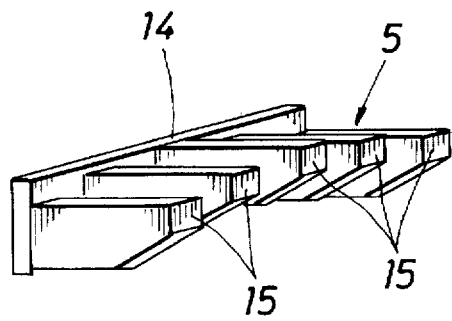
FIG. 4 is a perspective view of a second part of the apparatus of FIGS. 1 and 2.

The illustrated embodiment of the invention essentially comprises two components; a guard/cutting member 4 and a toothed member 5. The guard/cutting member 4 is shown in isolation in FIG. 3 and the toothed member 5 is shown in isolation in FIG. 4.

The guard/cutting member comprises a main plate 6 which has laterally extending support webs 7 welded to its bottom end, at each side of an arched cut-away 8. The main plate 6 has side walls 6a which are parallel to one another at its lower end, in the region of the cut-away 8, but which curve away from each other towards its upper end, so that the upper end of the main plate 6 is wider than its lower end.

The upper end of the main plate 6 is arcuate and supports a curved wire catching member 9. The curved wire catching member 9 extends slightly, at each end thereof, beyond the side walls 6a of the main plate 6. Each end of the wire catching member 9 defines a serrated wire cutting edge 10.

A series of five parallel vertical slots 11 are provided within the upper region of the main plate 6, i.e. between the arched cut-away 8 and the curved wire catching member 9.

The main plate 6 is provided with bolt holes 12 spaced around the arched cut-away 8 and further comprises a base plate 13 which is securable to the bottom of the main plate 6 by way of bolts (not shown) which extend into the under surface of the support webs 7, so as to close the bottom of the arched cut-away 8.

The toothed member 5 comprises a rectangular support plate 14 which supports an arcuate array of five teeth 15 which extend perpendicular from the support plate 13.

To fit the apparatus to a vehicle, the guard/cutting member 4 is first secured to the axle assembly 1, between the vehicle body 3 and the wheel hub 2a, by fitting the arched cut-away 8 of the main plate 6 around the axle and then securing the base plate 13 to the bottom of the main plate 6. The main plate 6 is further secured to the axle assembly by way of bolts (not shown) which extend through the bolt holes 12. The toothed member 5 is then secured to the vehicle body 3, by welding the support plate 14 to the vehicle body 3, above the axle assembly 1 in such a position that the teeth 15 are received within respective slots 11 provided in the main plate 6 (and are free to move within the slots 6 in the manner described below).

The arrangement and inter-engagement of the toothed member 5 and the cutting/guard member 4 is such that relative movement in a generally vertical direction between the vehicle body 3 and the guard/cutting member 4 is accommodated without the toothed member 5 disengaging from the guard/cutting member 4. That is, in vehicles of this type axle assemblies are designed to pivot up and down by the order of 7° in either direction to allow for irregularities in the surfaces over which the vehicle is intended to travel.

The location of the apparatus in relation to the positioning of the vehicle wheel 2 is illustrated in FIG. 2 which schematically illustrates a wheel 2 in position. From FIG. 2 it will be seen that the guard/cutting member 4 is dimensioned so that the wire catching member 9 lies just below the rim 2b of the wheel and follows its curvature. The gap between the wire catching member 9 and the wheel rim 2b can be minimal because both the guard/cutting member 4 and the wheel 2 move together as the axle assembly 1 moves.

The operation of the apparatus in use will now be described.

As discussed above, an object of the invention is to inhibit wire and the like (which is often disposed of in landfill sites) from entangling the axle assembly of a landfill compactor vehicle. That is, with conventional landfill compactor vehicles wire etc. can be snared by the teeth of a wheel and thus picked up as the wheel rotates. The wire can then fall from the wheel rim to the axle such that continued rotation of the wheel tightly wraps the wire around the axle assembly. The present invention has several features which inhibit this fouling of the axle assembly.

As mentioned above, the guard/cutting member 4 is fixed to the axle assembly 1 so that it moves up and down with the axle assembly and the wheel 2 the wire catching member 9 at all times remaining adjacent the wheel rim 2b. Thus, at least some wire etc. picked up by the vehicle wheel will be caught by the wire catching member 9 as it falls from the wheel rim 2b towards the axle, which thereby prevents it from reaching the axle assembly (it should be noted that the clearance between the wire catching member 9 and the wheel rim 2b is minimal so that wire etc. cannot fall between the two). As the wheel 2 continues to rotate any wire which is caught by the wire catching member 9 is pulled over its curved surface and onto one of the cutting edges 10 (depending on which way the wheel is rotating). Further rotation of the wheel will then pull the wire over the cutting edge 10 with considerable force so that the wire is severed and falls away from the vehicle.

Because axle assemblies of landfill compactor vehicles are designed for considerable pivotal movement (to allow for the irregularities in the surface over which the vehicle most move) a relatively large clearance must be provided between the guard/wire cutting member 4 and the vehicle body 3. However, wire etc. which is not caught by the wire catching member 9 but fails between the guard/cutting member 4 and the vehicle body 3 is generally prevented from reaching, and thus entangling, the axle assembly 1 by the teeth 15 of the toothed member 5.

If some wire etc. does manage to bypass the teeth 15 and reach the axle assembly 1 (which has not been observed in tests so far performed) it will nevertheless be inhibited from wrapping tightly around the axle. That is, as the axle assembly moves up and down with movement of the vehicle, the teeth 15 will effectively move up and down relative to the axle assembly 1 so that any wire etc. which passes over the teeth 15 and is then wound around the underside of the axle assembly 1 will tend to be pulled loose by the relative movement between the teeth 15 and the axle assembly 1.

Thus, it will be seen that the present invention provides apparatus which actually cuts away some wire etc. which might otherwise tend to entangle the axle assembly, and any wire which is not cut-away is nevertheless prevented from wrapping tightly around the axle assembly by the toothed member 5.

It will be appreciated that many modifications could be made to the detailed structure of the apparatus disclosed above. For instance, modifications might be made to render the apparatus suitable for fitting to a variety of differing vehicle axle/wheel assemblies.

As one possible modification to the apparatus, the wire catching member 9 could be provided with a central raised portion, or spine, along its length (for instance provided by welding a curved square sectioned bar to its upper surface) one edge of which lies adjacent the inner edge of the wheel rim to further reduce the possibility of wire etc. falling between the apparatus and the wheel. Alternatively, the plate 6 could be larger relative to the wheel so that the wire catching member 9 overlaps the upper edge of the wheel rim 2b rather than lying beneath it.

In addition, it will be appreciated by the skilled person that even without provision of the toothed member 5, the apparatus will provide benefit in preventing at least some wire etc. from fouling the axle assembly. Similarly, it will be appreciated that while provision of the cutting edges 10 is advantageous, and therefore preferred, the apparatus could still usefully function without cutting edges.

As one possible modification, upper edges of the teeth 15 could be provided with cutting edges to sever any wire etc. which wraps around the teeth 15 and then around the axle assembly 1, the necessary cutting force being provided by vertical movement of the axle assembly relative to the toothed members 5.

It will be understood that the function served by the toothed member 5 could be achieved by other structures with differing manners of engagement with the guard/cutting member 4. For instance, some form of strong flexible elements could be fitted between the vehicle body 3 and the guard/cutting member 4. For example, short lengths of strong steel cable could be secured at respective ends to the vehicle body 3 and the guard/cutting member 4, relative movement between the vehicle body 3 and the guard/cutting member 4 be accommodated by the flexibility of the steel cable. Other possible arrangements will be apparent to the appropriately skilled person.

It will be understood that the above described embodiments and modifications are to be considered as illustrative and not restrictive, the scope of the invention being indicated by the appended claims, rather than the foregoing description, and that accordingly all changes which come with the meaning and range of the claims are intended to be embraced therein.

We claim:

1. Apparatus for inhibiting elongate flexible elements from entangling the axle assembly of a vehicle wheel, the apparatus comprising:
    a guard member securable to the vehicle axle assembly between the wheel and the body of the vehicle, the guard member having a radially outer portion defining an arcuate surface which in use lies adjacent the rim of the wheel and follows the curvature of the wheel so as to substantially prevent elongate flexible elements from passing between the guard member and the wheel.

2. Apparatus according to claim 1, wherein said arcuate surface has two opposite ends at least one end of the arcuate surface defining said cutting edge for cutting elongate flexible elements which are pulled thereover by rotation of the vehicle wheel.

3. Apparatus according to claim 2, wherein both ends of said arcuate surface define a cutting edge.

4. Apparatus according to claim 1, wherein said outer portion of the guard member defines an arcuate surface which has two opposite ends and which in use lies adjacent the rim of the wheel and follows the curvature of the wheel, further comprising at least one cutting edge on or adjacent said outer portion of the guard member for cutting elongate flexible elements which are pulled thereover by rotation of the vehicle wheel.

5. Apparatus according to claim 1, wherein the apparatus comprises at least one further member which in use extends between the guard member and the vehicle body so as to inhibit elongate flexible elements from passing between the guard member and the vehicle body and entangling the axle assembly, the or each further member being adapted to allow a degree of relative movement between the guard member and the vehicle body.

6. Apparatus according to claim 5, wherein the or each said further member is securable to the vehicle body and is adapted to inter-engage with the guard member in such a way as to permit a degree of relative movement between the guard member and the vehicle body in a generally vertical direction, wherein relative movement of the or each further member towards and away from the axle assembly as the axle assembly moves relative to the vehicle body tends to pull loose any elongate flexible elements wrapped around the or each further member and the axle assembly.

7. Apparatus according to claim 1, wherein said guard member comprises a plate which supports said outer portion of the guard member, said plate in use lying substantially parallel to the vehicle body and being provided with at least one substantially vertical slot, wherein the apparatus further comprises a tooth member which is securable to the vehicle body and which supports at least one tooth which in use extends from the vehicle body and is received within said slot thereby interengaging with the guard member so as to permit a degree of relative movement between the guard member and the vehicle body in a generally vertical direction, whereby in use the or each tooth inhibits elongate flexible elements from passing between the guard member and the vehicle body and wherein relative movement of the or each further member towards and away from the axle assembly as the axle assembly moves relative to the vehicle body tends to pull loose any elongate flexible elements wrapped around the or each further member and the axle assembly.

8. Apparatus according to claim 7, wherein said plate is provided with a plurality of substantially vertical slots arranged generally parallel to one another, and said tooth member is provided with a corresponding number of teeth which in use are received within respective slots in said plate.

9. Apparatus according to claim 8, wherein said teeth are arranged in an arcuate array.

10. Apparatus according to claim 1, further provided with at least one cutting edge on or adjacent said surface of the guard member for cutting elongate flexible elements which are pulled thereover by rotation of the vehicle wheel.

11. Apparatus according to claim 10, wherein the or each cutting edge is defined by said outer portion of the guard member.

12. Apparatus for inhibiting elongate flexible elements from entangling the axle assembly of a vehicle wheel, the axle assembly being mounted to the vehicle such that it is capable of generally vertical movement relative thereto as the vehicle moves, the apparatus comprising:
    a guard member securable to the vehicle axle assembly between the wheel and the vehicle body, the guard member having a radially outer portion which in use lies adjacent the wheel so as to inhibit elongate flexible elements from passing between the guard member and the wheel; and at least one further member which is securable to the vehicle body and which in use extends from the vehicle body to the guard member so as to inhibit elongate flexible elements from passing between the vehicle body and the guard member to the axle assembly, the or each further member being adapted to cooperate with the guard member in such a way as to permit a degree of relative movement therebetween in a generally vertical direction wherein relative movement of the or each further member towards and away from the axle assembly as the axle assembly moves relative to the vehicle body tends to pull loose any elongate flexible elements wrapped around the or each further member and the axle assembly.

13. Apparatus according to claim 12, wherein the guard member comprises a plate which in use lies substantially parallel to the vehicle body and which supports said outer portion of the guard member, and the or each said further member is adapted to inter-engage with said plate.

14. Apparatus according to claim 13, wherein the or each further member is a tooth which is securable to the vehicle body so as to extend therefrom, and said plate is provided with at least one substantially vertical slot, the number of slots corresponding to the number of said teeth, the or each slot in use receiving a respective tooth therein.

15. A wheeled vehicle, comprising a vehicle body and a plurality of wheels mounted on respective axle assemblies which extend from said vehicle body, at least one of said axle assemblies having associated therewith:

a guard member securable to the vehicle axle assembly between the wheel and the body of the vehicle, the guard member having a radially outer portion defining an arcuate surface which in use lies adjacent the rim of the wheel and follows the curvature of the wheel so as to substantially prevent elongate flexible elements from passing between the guard member and the wheel.

* * * * *